May 20, 1969 KARL-HEINZ GREIFENHAGEN 3,445,607
DEVICE FOR SUBSEQUENTLY APPLYING AN ADDITIONAL
RECORDING TO A PRIMARY RECORDING
Filed Aug. 30, 1965
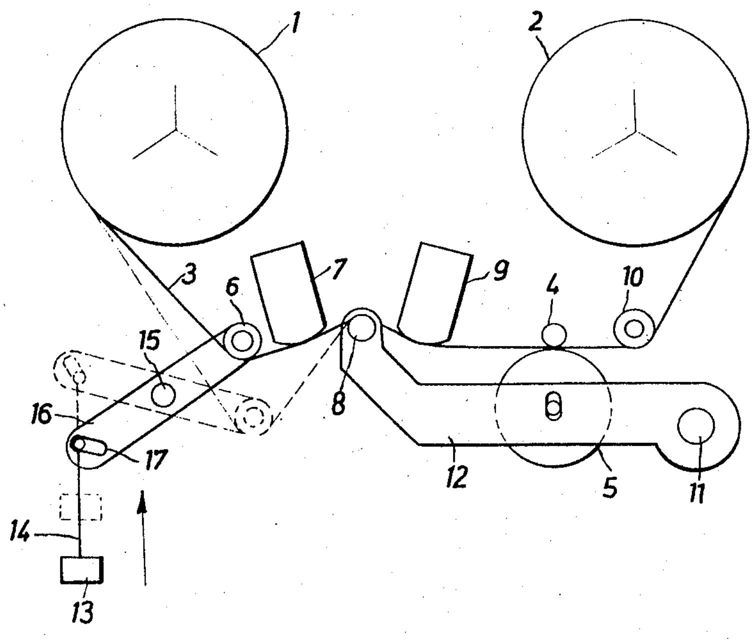
Inventor:
Karl Heinz Greifenhagen United States Patent Office 3,445,607
Patented May 20, 1969

3,445,607

DEVICE FOR SUBSEQUENTLY APPLYING AN ADDITIONAL RECORDING TO A PRIMARY RECORDING

Karl-Heinz Greifenhagen, Gottfried-Neukamstrasse 6, Kronach, Upper Franconia, Germany Filed Aug. 30, 1965, Ser. No. 483,878
Claims priority, application Germany, Sept. 3, 1964, L 37,878
Int. Cl. G11b *5/00*
U.S. Cl. 179—100.2 1 Claim

ABSTRACT OF THE DISCLOSURE

In a magnetic tape recorder a tape guide and diverting pin which is disposed in a range between a feed spool and an erase head is mounted on a swivel arm to remove the tape from said erase head.

Where on a magnetic tape recording, e.g., a sound recording, an additional recording is to be applied subsequently and both recordings are to be audible on reproduction (trick recording), the action of the erasing head must be at least partially suspended during the additional recording process in order that the primary recording remains intact. In a known manner, therefore, a trick button is provided. If this is pressed whilst the tape is being played back, the erasing current for the erase head is reduced to erase the prior recording only partly. In another device the magnetic tape is held off the erasing head somewhat, e.g., by having a swivel lever with a tape removing pin between the erasing and the recording/reproducing heads. Other known arrangements are based on (a) an erase head adjustable vertically to the direction of tape run or (b) an erase had which can be removed from the tape.

Whereas electrical change-over of the erasing current can cause undesirable clicking when the sound is reproduced, a swivel lever with a tape removing pin is an additional component, and an adjustable or movable erase head brings additional problems in the parallel guiding of the head and the erasing current lead.

In accordance with the invention, therefore, a device for subsequently applying an additional recording to a primary recording on a magnetic tape is constructed so that a tape guide pin is mounted on a swivel arm in a range between take-up reel and erase head of the tape recorder.

The utilisation of a pin disposed on a swivel arm as means to guiding and removing the tape from the erase head gives technical simplification as compared with the known trick devices and enhances dependability.

Appropriately the swivel arm is suspended in the middle and a point of application for an operating element is provided at one end and the tape guide pin disposed at the other end. The operating element can be, e.g., a rigid bar provided with a push button (trick button).

Details of the invention are explained with the help of the exemplary design shown in the drawing.

In the drawing 1 indicates a left-hand spindle for taking-up a feed reel and 2 a right-hand spindle for supporting a take-up reel of a tape recorder. A tape 3 is driven in the conventional manner by a capstan 4 running at constant speed in combination with an elastic pressure roller 5. The tape, e.g., coming from feed reel 1, and passing a tape guide pin 6, a fixed erase head 7, a guide roller and/or guide pin 8 and a recording/reproducing head 9, passing also between the capstan and pressure roller and a second tape guide pin 10, arrives at the empty take-up reel 2. The guide roller 8, tensioning the tape in a range between the erase head and the recording/reproducing head, is disposed at the free end and the pressure roller 5 about in the middle of a pivoted lever 12 which can be swivelled round the axis 11, such lever switching on the tape motion in a first position and off in a second position.

In the pressure position of the lever the tape is therefore in motion, and a recording, the so-called primary recording, can be made with the recording/reproducing head 9.

If now subsequently an additional recording is to be applied to the primary recording, with slight damping of the first recording, a push button 13 (trick button) is depressed which over a bar 14 moved in the direction of the arrow swivels a two-armed lever 16 which can be swivelled round a pin 15 and bearing on one end the tape guide pin 6 and on the other end is engaged with bar 14 by means of a long slot 17. With the trick button depressed the tape is removed from the erase head 7 and transferred to the position shown in the drawing by a broken line. The contact between the tape and the recording/reproducing head remains retained because of the position of the guide roller 8. When the trick button is depressed and the tape motion switched on an additional recording can thus be made on an already existing primary recording, without the primary recording being previously completely erased by erasing head 7.

The trick button is appropriately provided with means to bring it automatically back to the rest position on release. This avoids its remaining inadvertently in the working position at the end of an additional recording, which of course would result in an unwanted additional recording.

I claim:

1. In a magnetic tape recorder comprising a spindle for supporting a feed reel, a first tape guide and diverting pin, an erase head, a recording/reproducing head, a capstan, a pivoted lever, a guide roller mounted on said lever for tensioning the tape in a range between said erase head and said recording/reproducing head, a pressure roller mounted on said lever for cooperating with said capstan, a second tape guide pin, and a spindle for supporting a take-up reel, the combination of a swivel arm with a first and a second end, said first guide pin being mounted on said first end and a push button being connected to said second end whereby upon actuation of said push button said first guide pin removes the tape from contact with the erase head.

References Cited

UNITED STATES PATENTS 2,639,333 5/1953 Howell et al. ______ 179—100.2

FOREIGN PATENTS 163,387 11/1948 Austria.

OTHER REFERENCES

Magnetic Sound Recording, by D. A. Snel, © 1958, page 162.

BERNARD KONICK, *Primary Examiner.*

J. R. GOUDEAU, *Assistant Examiner.*